(12) United States Patent
Jing et al.

(10) Patent No.: US 9,856,366 B2
(45) Date of Patent: Jan. 2, 2018

(54) PLASTIC COMPOSITIONS THAT INCLUDE PLASTICIZERS CONTAINING AN ACYLATED PHENOLATED FATTY ACID ESTER

(71) Applicant: Georgia-Pacific Chemicals LLC, Atlanta, GA (US)

(72) Inventors: Feng Jing, Snellville, GA (US); Irving D. Sand, Ellenwood, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 35 days.

(21) Appl. No.: 15/094,431

(22) Filed: Apr. 8, 2016

(65) Prior Publication Data

US 2016/0297950 A1    Oct. 13, 2016

Related U.S. Application Data

(60) Provisional application No. 62/146,222, filed on Apr. 10, 2015.

(51) Int. Cl.
*C08K 5/103*    (2006.01)
*C08K 5/105*    (2006.01)

(52) U.S. Cl.
CPC ................... *C08K 5/105* (2013.01)

(58) Field of Classification Search
CPC ..................................................... C08K 5/105
See application file for complete search history.

(56) References Cited

FOREIGN PATENT DOCUMENTS

JP    30004345 B    *    6/1955

OTHER PUBLICATIONS

Translation of JP 30004345 B, 1955.*

* cited by examiner

Primary Examiner — Wenwen Cai
(74) Attorney, Agent, or Firm — Ram W. Sabnis

(57) ABSTRACT

Plastic compositions that include one or more plasticizers containing acylated phenolated fatty acid esters and methods for making same are provided. In some examples, the plastic composition can include a polymer and a plasticizer. The polymer can be or include a polyvinyl chloride, a polyvinylidene chloride, a cellulose ester, a cellulose ether, a cellulose nitrate, a polyacrylate, a polyurethane, a copolymer thereof, or any mixture thereof. The plasticizer can be or include an acylated phenolated fatty acid monoester, an acylated phenolated fatty acid diester, or a mixture thereof. The plastic composition can include the plasticizer in an amount of about 10 wt % to about 60 wt %, based on a combined weight of the polymer, any acylated phenolated fatty acid monoester, and any acylated phenolated fatty acid diester.

20 Claims, No Drawings

PLASTIC COMPOSITIONS THAT INCLUDE PLASTICIZERS CONTAINING AN ACYLATED PHENOLATED FATTY ACID ESTER

CROSS-REFERENCE TO RELATED APPLICATION

This application claims priority to U.S. Provisional Patent Application No. 62/146,222, filed on Apr. 10, 2015, which is incorporated by reference herein.

BACKGROUND

Field

Embodiments described generally relate to plastic compositions that include one or more plasticizers and methods for making the plasticizers and plastic compositions. More particularly, such embodiments relate to plastic compositions that include one or more plasticizers containing acylated phenolated fatty acid esters and methods for making the plasticizers and plastic compositions.

Description of the Related Art

Phthalates have long been used as plasticizers. Several countries have banned certain phthalates for use in plastic compositions, at least in the manufacture of plastic compositions for certain products, e.g., children's products. Some of the phthalates that have been banned or limited in use include bis(2-ethylhexyl) phthalate (DEHP), dibutyl phthalate (DBP), and benzylbutylphtalate. As such, the number of available plasticizers that can be used for making plastic compositions has reduced, which limits the options available for tailoring certain properties of the plastic compositions, e.g., the glass transition temperature.

There is a need, therefore, for new plasticizers, plastic compositions containing the plasticizers, and methods for making same.

SUMMARY

Plastic compositions that include one or more plasticizers containing acylated phenolated fatty acid esters and methods for making same are provided. In some examples, the plastic composition can include a polymer and a plasticizer. The polymer can be or include a polyvinyl chloride, a polyvinylidene chloride, a cellulose ester, a cellulose ether, a cellulose nitrate, a polyacrylate, a polyurethane, a copolymer thereof, or any mixture thereof. The plasticizer can be or include an acylated phenolated fatty acid monoester, an acylated phenolated fatty acid diester, or a mixture thereof. The plastic composition can include the plasticizer in an amount of about 10 wt % to about 60 wt %, based on a combined weight of the polymer, any acylated phenolated fatty acid monoester, and any acylated phenolated fatty acid diester.

In some examples, the method for making a plasticizer can include reacting an unsaturated fatty acid with an aromatic alcohol to produce a phenolated fatty acid. The phenolated fatty acid can be reacted with a capping reagent to produce a phenolated fatty acid monoester. The phenolated fatty acid monoester can be reacted with an acylation reagent to produce an acylated phenolated fatty acid monoester.

In some examples, the method for making a plasticizer can include reacting an unsaturated fatty acid with an aromatic alcohol to produce a phenolated fatty acid. The phenolated fatty acid can be reacted with a coupling reagent to produce a phenolated fatty acid diester. The phenolated fatty acid diester can be reacted with an acylation reagent to produce an acylated phenolated fatty acid diester.

DETAILED DESCRIPTION

Plastic compositions can be made or produced by mixing, blending, extruding, or otherwise combining one or more polymers and one or more plasticizers. The plasticizer can be or include one or more acylated phenolated fatty acid monoesters, one or more acylated phenolated fatty acid diesters, or any mixture thereof. The polymer can be or include, but is not limited to, one or more homogeneous polymers, one or more heterogeneous polymers, one or more copolymers, or any mixture thereof. In some examples, the polymer can be or include, but is not limited to, one or more polyvinyl chlorides (PVCs), one or more polyvinylidene chlorides (PVDCs), one or more cellulose esters, one or more cellulose ethers, one or more cellulose nitrates, one or more polyacrylates, one or more polyurethanes, one or more copolymers thereof, or any mixture thereof.

It has been surprisingly and unexpectedly discovered that the acylated phenolated fatty acid esters can be more compatible with the polymers, e.g., polyvinyl chlorides, than plasticizers that lack aromatic moieties such as epoxidized soybean oil or the commercially available plasticizer PARAPLEX® G-25, available from Hall Star. Without wishing to be bound by theory, it is believed that the improved compatibility of the acylated phenolated fatty acid esters with polyvinyl chlorides, for example, is due, at least in part, from the polarizability of the aromatic ring that can interact favorably with the polar C—Cl bond.

The plastic composition can include about 10 wt %, about 20 wt %, about 30 wt %, or about 40 wt % to about 50 wt %, about 60 wt %, about 70 wt %, or about 80 wt % of the plasticizer, based on a combined weight of the plasticizer and the polymer. For example, the plastic composition can include about 30 wt % to about 40 wt %, about 35 wt % to about 45 wt %, about 40 wt % to about 50 wt %, about 45 wt % to about 55 wt %, about 50 wt % to about 60 wt %, or about 55 wt % to about 65 wt % of the plasticizer, based on a combined weight of the plasticizer and the polymer.

The plastic composition can include about 10 wt %, about 20 wt %, about 30 wt %, or about 40 wt % to about 50 wt %, about 60 wt %, about 70 wt %, or about 80 wt % of the acylated phenolated fatty acid monoester, based on a combined weight of the acylated phenolated fatty acid monoester and the polymer. For example, the plastic composition can include about 30 wt % to about 40 wt %, about 35 wt % to about 45 wt %, about 40 wt % to about 50 wt %, about 45 wt % to about 55 wt %, about 50 wt % to about 60 wt %, or about 55 wt % to about 65 wt % of the acylated phenolated fatty acid monoester, based on a combined weight of the acylated phenolated fatty acid monoester and the polymer.

The plastic composition can include about 10 wt %, about 20 wt %, about 30 wt %, or about 40 wt % to about 50 wt %, about 60 wt %, about 70 wt %, or about 80 wt % of the acylated phenolated fatty acid diester, based on a combined weight of the acylated phenolated fatty acid diester and the polymer. For example, the plastic composition can include about 30 wt % to about 40 wt %, about 35 wt % to about 45 wt %, about 40 wt % to about 50 wt %, about 45 wt % to about 55 wt %, about 50 wt % to about 60 wt %, or about 55 wt % to about 65 wt % of the acylated phenolated fatty acid diester, based on a combined weight of the acylated phenolated fatty acid diester and the polymer.

The plastic composition can include about 10 wt %, about 20 wt %, about 30 wt %, or about 40 wt % to about 50 wt %, about 60 wt %, about 70 wt %, or about 80 wt % of a combined weight of any acylated phenolated fatty acid monoester and any acylated phenolated fatty acid diester, based on a combined weight of any acylated phenolated fatty acid monoester, any acylated phenolated fatty acid diester, and the polymer. For example, the plastic composition can include about 30 wt % to about 40 wt %, about 35 wt % to about 45 wt %, about 40 wt % to about 50 wt %, about 45 wt % to about 55 wt %, about 50 wt % to about 60 wt %, or about 55 wt % to about 65 wt % of a combined weight of any acylated phenolated fatty acid monoester and acylated phenolated fatty acid diester, based on a combined weight of any acylated phenolated fatty acid monoester, any acylated phenolated fatty acid diester, and the polymer.

In some examples, when the plasticizer includes the acylated phenolated fatty acid monoester, the acylated phenolated fatty acid diester, or a mixture thereof, the plastic composition can include the plasticizer in an amount of about 10 wt %, about 20 wt %, about 30 wt %, or about 40 wt % to about 50 wt %, about 60 wt %, about 70 wt %, or about 80 wt %, based on a combined weight of the polymer, any acylated phenolated fatty acid monoester, and any acylated phenolated fatty acid diester. For example, the plastic composition can include the plasticizer in an amount of about 30 wt % to about 40 wt %, about 35 wt % to about 45 wt %, about 40 wt % to about 50 wt %, about 45 wt % to about 55 wt %, about 50 wt % to about 60 wt %, or about 55 wt % to about 65 wt %, based on a combined weight of the polymer, any acylated phenolated fatty acid monoester, and any acylated phenolated fatty acid diester.

The plasticizer can reduce the glass transition temperature (Tg) of the polymer. The glass transition of the polymers and the plastic compositions that include one or more polymers and one or more plasticizers can be measured according to ASTM E1356.

In some examples, the polymer and the plasticizer can be mixed, blended, extruded, or otherwise combined to produce the plastic composition. The polymer and/or the plasticizer can be in a molten state, a liquid state, a solid state, or any mixture thereof. For example, one or more polymers and one or more plasticizers can be mixed, blended, extruded, or otherwise combined in a molten state to produce the plastic composition. In some examples, a molten mixture of the polymer and the plasticizer can be extruded in a single screw extruder, a twin screw extruder, or other types of extruders. In other examples, roll mills can be used to blend the mixture of the polymers and plasticizers in a molten state to produce the plastic composition.

In other examples, the plastic composition can be produced by solvent casting. For example, one or more polymer solutions and one or more plasticizer solutions can be mixed, blended, or otherwise combined to produce a polymer-plasticizer solution. The polymer-plasticizer solution can be cast onto a plate, e.g., a glass plate, or other surface, to produce a membrane or can be introduced to a three-dimensional mold to produce a scaffold. In some examples, one or more particles, e.g., one or more salts, can be mixed blended, or otherwise combined with the polymer-plasticizer solution. After casting or introducing to the mold and removing the solvent, the particles can be removed, e.g., by dissolving with a solvent, to produce a porous structure.

The polymer solution can include a first solvent and one or more polymers and the plasticizer solution can include a second solvent. The first solvent and the second solvent can be removed from the polymer-plasticizer solution to produce a plastic composition. Each of the first solvent and the second solvent independently can be or include, but is not limited to, tetrahydrofuran, pyridine, N-methyl-2-pyrrolidone (NMP), butan-2-one, acetone, methylene chloride, ethers, esters, benzene, toluene, hexanes, isomers thereof, or any mixture thereof.

In some examples, the polymer solution can include the polymer in an amount of about 1 wt %, about 3 wt %, about 5 wt %, about 7 wt %, about 10 wt %, about 15 wt %, or about 20 wt % to about 25 wt %, about 30 wt %, about 35 wt %, about 40 wt %, about 45 wt %, or about 50 wt %, based on a combined weight of the polymer and the first solvent. The plasticizer solution can include the plasticizer in an amount of about 1 wt %, about 3 wt %, about 5 wt %, about 7 wt %, about 10 wt %, about 15 wt %, or about 20 wt % to about 25 wt %, about 30 wt %, about 35 wt %, about 40 wt %, about 45 wt %, or to about 50 wt %, based on a combined weight of the plasticizer and the second solvent. In other examples, the polymer solution can include the polymer in an amount of about 5 wt % to about 20 wt %, based on a combined weight of the polymer and the first solvent. The plasticizer solution can include the plasticizer in an amount of about 5 wt % to about 20 wt %, based on a combined weight of the plasticizer and the second solvent.

The polymer-plasticizer solution can have a weight ratio of the plasticizer solution to the polymer solution of about 15:85, about 20:80, about 25:75, or about 30:70 to about 35:65, about 40:60, or about 45:55. For example, the polymer-plasticizer solution can have a weight ratio of the plasticizer solution to the polymer solution of about 20:80 to about 40:60, based on a combined weight of the plasticizer solution and the polymer solution. In some examples, the plastic composition can include the plasticizer in an amount of about 10 wt % to about 60 wt %, based on a combined weight of the plasticizer and the polymer. In other examples, the plastic composition can include the plasticizer in an amount of about 20 wt % to about 40 wt %, based on a combined weight of the plasticizer and the polymer.

The solvent in the polymer-plasticizer solution can be removed, e.g., via evaporation, to produce the plastic composition. The polymer-plasticizer solution can include one or more particles, e.g., one or more salts, when cast or introduced to the mold. The solvent can be removed using any suitable method or combination of methods. For example, the solvent can be removed by allowing the polymer-plasticizer to air dry, drying under vacuum, heating, e.g., in an oven, or any combination thereof. In one example the polymer-plasticizer can be heated to a temperature of about 40° C., about 50° C., or about 60° C. to about 70° C., about 80° C., about 90° C., or more to accelerate the removal of the solvent.

The one or more acylated phenolated fatty acid monoesters can be produced by reacting one or more phenolated fatty acid monoesters with one or more acylation reagents. The one or more phenolated fatty acid monoesters can be produced by reacting one or more phenolated fatty acids with one or more capping reagents. The one or more phenolated fatty acids can be produced by reacting one or more unsaturated fatty acids with one or more aromatic alcohols. The one or more acylated phenolated fatty acid diesters can be produced by reacting one or more phenolated fatty acid diesters with one or more acylation reagents. The one or more phenolated fatty acid diesters can be produced by reacting one or more phenolated fatty acids with one or more coupling reagents. The one or more phenolated fatty acids can be produced by reacting one or more unsaturated fatty acids with one or more aromatic alcohol.

One or more unsaturated fatty acids can be reacted with one or more aromatic alcohols to produce one or more phenolated fatty acids, as illustrated in Schematic (I).

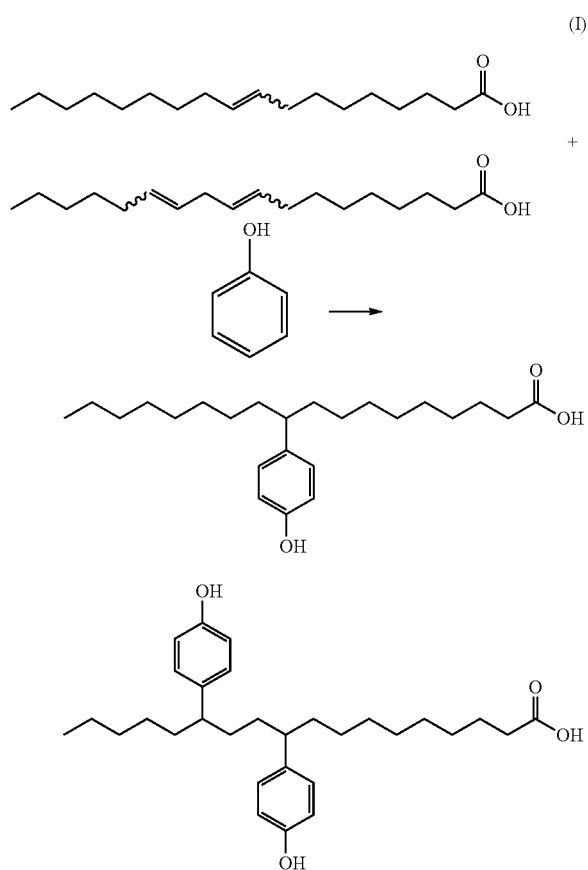

For illustrative purposes only, Schematic (I) depicts that the unsaturated fatty acids can be or include $C_{18}$-fatty acids with one or two sites of unsaturation (each unsaturated carbon-carbon bond). It should be noted, however, that the unsaturated fatty acids can be or include one or more of a variety of unsaturated fatty acids. For example, the unsaturated fatty acids can be or include, but are not limited to, $C_{10}$-$C_{24}$-fatty acids that can have 1, 2, 3, 4, 5, 6, or more sites of unsaturation per molecule. Some sources of unsaturated fatty acids can be or include, but are not limited to, one or more vegetable oils, one or more crude tall oils, one or more animal fats or oils, portions thereof, fractions thereof, or any mixture thereof. As used herein, the term crude tall oil ("CTO") refers to the crude by-product, and only the crude by-product, recovered as soap skimmings from the black liquor of a Kraft pulping process. The term crude tall oil ("CTO"), as used herein, purposefully excludes any derivatives and intermediates produced from extraction or distillation.

Illustrative vegetable oils can be or include, but are not limited to, soybean oil, canola oil, corn oil, sunflower oil, flaxseed oil, sesame oil, olive oil, peanut oil, cottonseed oil, safflower oil, rape seed oil, avocado oil, palm oil, salts thereof, esters thereof, or any mixture thereof. Other unsaturated fatty acid sources can be or include, but are not limited to, one or more fatty acids, tall oil fatty acids (TOFA), crude tall oils (CTO), distilled tall oils (DTO), depitched tall oil, tall oil pitches, portions thereof, fractions thereof, or any mixture thereof. The unsaturated fatty acids can be or include, but are not limited to, oleic acid, eicosenoic acid, erucic acid, nervonic acid, linoleic acid, rumenic acid, eicosadienoic acid, docosadienoic acid, linolenic acid, eicosatrienoic acid, arachidonic acid, docosatetraenoic acid, docosapentaenoic acid, docosahexaenoic acid, isomers thereof, salts thereof, esters thereof, or any mixture thereof. In some examples the fatty acid can be or include fatty acids in crude tall oil. In some example, the fatty acid can be or include fatty acids derived from crude tall oil. Fatty acids derived from crude tall oil can include the fatty acids in tall oil fatty acids, distilled tall oil, depitched tall oil, tall oil pitches, or any mixture thereof.

Representative tall oil products that can include unsaturated fatty acids used to form the phenolated fatty acids, can be or include, but are not limited to, XTOL® 100, XTOL® 300, XTOL® 304, XTOL® 520, and XTOL® 3030 tall oil products, all of which are commercially available from Georgia-Pacific Chemicals LLC, Atlanta, Ga. In some examples, the unsaturated fatty acid can be or include unsaturated fatty acid esters, such as fatty acid methyl esters (FAME), fatty acid ethyl esters, or a mixture thereof.

When fatty acids from vegetable oils, animal fats or oils, and/or tall oil are used to produce the phenolated fatty acid, the phenolated fatty acid can be described or characterized as being bio-derived. Accordingly, the acylated phenolated fatty acid esters and the acylated phenolated fatty acid diesters discussed and described herein can be derived from renewable biological sources and can be referred to as bio-derived acylated phenolated fatty acid monoesters and bio-derived acylated phenolated fatty acid diesters.

For illustrative purposes only, Schematic (I) also depicts that the aromatic alcohol can be or include a phenol. It should be noted, however, that the aromatic alcohol can be or include one or more types of aromatic alcohols. For example, suitable aromatic alcohols can be or include, but are not limited to, phenol, substituted phenols, other aromatic alcohols, or any mixture thereof. According, as used herein, the terms "phenolated fatty acid" and "phenolated fatty acids" are used interchangeably to refer to a reaction product formed from reacting one or more fatty acids and (1) phenol, (2) one or more substituted phenols, (3) one or more other aromatic alcohols, or (4) any mixture thereof. Illustrative aromatic alcohols can be or include, but are not limited to, phenol, 1-naphthol, 2-naphthol, a cresol, a xylenol, guaiacol, bisphenol A, a polyphenol, benzyl alcohol, 2-phenylethanol, isomers thereof, or any mixture thereof. In one example the aromatic alcohol can be or include phenol.

The aromatic alcohol can be mixed, blended, or otherwise combined with the unsaturated fatty acid in a molar excess. In some examples, for each mole of unsaturated sites on the unsaturated fatty acid, about 1, about 1.2, or about 1.5 to about 2, about 2.5, about 3, about 4, about 5, or more moles of the aromatic alcohol can be mixed, blended, combined, and/or reacted with the unsaturated fatty acid. For example, for each mole of unsaturated sites on the unsaturated fatty acid the number of moles of the aromatic alcohol that can be mixed, blended, combined, and/or reacted with the unsaturated fatty acid can be about 1, about 1.3, about 1.7, or about 2 to about 2.7, about 3.3, about 3.7, about 4.3, about 4.7, about 5, or about 5.5.

For illustrative purposes only, Schematic (I) depicts the phenolated fatty acids as having fully saturated fatty acids. It should be noted, however, that the phenolated fatty acids can include one or more unsaturated bonds on the fatty acid motif. For example, the phenolated fatty acids can be or include one or more of phenolated saturated fatty acids, one or more of phenolated unsaturated fatty acids, or any mixture thereof. Phenolated unsaturated fatty acids can have 1, 2, 3, 4, 5, 6, or more sites of unsaturation per molecule.

The aromatic alcohol can be mixed, blended, combined, and/or reacted with the unsaturated fatty acids in an amount of about 20 wt %, about 30 wt %, about 40 wt %, about 50 wt %, or about 70 wt % to about 90 wt %, about 100 wt %, about 110 wt %, about 120 wt %, about 150 wt %, about 200 wt %, about 250 wt %, about 300 wt %, or greater, based on a combined weight of the unsaturated fatty acid and the aromatic alcohol. For example, the aromatic alcohol can be combined and/or reacted with the unsaturated fatty acids in an amount of about 20 wt % to about 300 wt %, about 50 wt % to about 200 wt %, about 80 wt % to about 120 wt %, or about 90 wt % to about 110 wt %, based on a combined weight of the unsaturated fatty acids and the aromatic alcohol.

In some examples, the unsaturated fatty acids and the aromatic alcohol can be mixed, blended, combined, and/or reacted in the presence of one or more phenolation catalysts to produce the phenolated fatty acid. The phenolation catalyst can be or include one or more Brønsted acids, one or more Lewis acids, or any mixture thereof. Illustrative Brønsted acids can be or include, but are not limited to, sulfuric acid, a sulfonic acid, polymeric sulfonic acids, polymeric perfluorosulfonic acids, phosphoric acids, orthophosphoric acid, metaphosphoric acid, pyrophosphoric acid, isomers thereof, hydrates thereof, salts thereof, or any mixture thereof. Illustrative sulfonic acids can be or include, but are not limited to, methanesulfonic acid, trifluoromethanesulfonic acid (also known as triflic acid), p-toluenesulfonic acid (also known as 4-methylbenzenesulfonic acid), dodecylbenzenesulfonic acid, taurine (also known as 2-aminoethanesulfonic acid), perfluorosulfonic acid polymers, sulfonated tetrafluoroethylene-based fluoropolymer materials, isomers thereof, acids thereof, esters thereof, salts thereof, complexes thereof, or any mixture thereof. Illustrative Lewis acids can be or include, but are not limited to, boron trifluoride, aluminum chloride, zinc chloride, iron chloride, tin chloride, titanium chloride, halides thereof, complexes thereof, salts thereof, or any mixture thereof. In some example, the phenolation catalyst can be or include one or more polymeric or resin sulfonic acids, such as one or more of the AMBERLYST® catalysts, commercially available from Dow Chemical Company. For example, AMBERLYST® 15 catalyst, AMBERLYST® 35 catalyst, and AMBERLYST® 36 catalyst can be used. Illustrative sulfonated tetrafluoroethylene-based fluoropolymer materials can include, but are not limited to, polymers, copolymer, oligomers, resins, or any mixture thereof. For example, the phenolation catalyst can be or include one or more perfluorosulfonic acid polymers and/or one or more sulfonated tetrafluoroethylene-based fluoropolymer-copolymers, such as NAFION® or NAFION-H® copolymers or resins, commercially available from DuPont Company.

The phenolation catalysts can be combined with the aromatic alcohol and the unsaturated fatty acids in an amount of about 0.1 wt %, about 0.5 wt %, about 1 wt %, about 2 wt %, or about 3 wt % to about 4 wt %, about 5 wt %, about 6 wt %, about 7 wt %, about 8 wt %, about 9 wt %, about 10 wt %, about 15 wt %, about 20 wt %, or greater, based on a combined weight of the unsaturated fatty acid and the aromatic alcohol. For example, the phenolation catalysts can be combined with the aromatic alcohol and the unsaturated fatty acids in an amount of about 0.1 wt % to about 20 wt %, about 0.5 wt % to about 15 wt %, about 1 wt % to about 10 wt %, about 2 wt % to about 9 wt %, about 3 wt % to about 7 wt %, or about 4 wt % to about 6 wt %, based on a combined weight of the unsaturated fatty acid and the aromatic alcohol.

The mixture of the unsaturated fatty acid, the aromatic alcohol, and the optional phenolation catalyst can be maintained at ambient temperature and/or heated to react and produce the phenolated fatty acid. The mixture of the unsaturated fatty acid, the aromatic alcohol, and the optional phenolation catalyst can be at a temperature of about 20° C., about 23° C., about 25° C., about 30° C., about 40° C., about 50° C., about 60° C., about 70° C., about 80° C., about 90° C., or about 100° C. to about 110° C., about 130° C., about 150° C., about 170° C., about 190° C., about 200° C., about 210° C., about 230° C., about 250° C., about 300° C., or greater to produce the phenolated fatty acid. For example, the mixture of the unsaturated fatty acid, the aromatic alcohol, and the optional phenolation catalyst can be at a temperature of about 20° C. to about 300° C., about 20° C. to about 250° C., about 20° C. to about 200° C., about 50° C. to about 250° C., about 50° C. to about 200° C., about 50° C. to about 150° C., about 50° C. to about 130° C., about 50° C. to about 110° C., about 80° C. to about 250° C., about 80° C. to about 200° C., about 80° C. to about 150° C., about 80° C. to about 130° C., or about 80° C. to about 110° C. to produce the phenolated fatty acid.

The unsaturated fatty acid, the aromatic alcohol, and the optional phenolation catalyst can be reacted, heated, or at the temperature for a period of about 1 hour (hr), about 2 hr, about 3 hr, about 5 hr, or about 7 hr to about 8 hr, about 10 hr, about 12 hr, about 15 hr, about 20 hr, about 24 hr, about 30 hr or longer to produce the phenolated fatty acid. For example, the unsaturated fatty acid, the aromatic alcohol, and the optional phenolation catalyst can be reacted, heated, or at the temperature for a period of about 1 hr to about 30 hr, about 2 hr to about 24 hr, about 4 hr to about 24 hr, about 4 hr to about 18 hr, about 4 hr to about 15 hr, about 4 hr to about 12 hr, about 4 hr to about 10 hr, about 4 hr to about 8 hr, about 6 hr to about 24 hr, about 6 hr to about 20 hr, about 6 hr to about 15 hr, about 6 hr to about 12 hr, or about 6 hr to about 10 hr to produce the phenolated fatty acid.

In some specific examples, the mixture of the unsaturated fatty acid, the aromatic alcohol, and the optional phenolation catalyst can be reacted, heated, or at the temperature of about 20° C. to about 250° C. and for a period of about 2 hr to about 24 hr to produce the phenolated fatty acid. In other specific examples, the mixture of the unsaturated fatty acid, the aromatic alcohol, and the optional phenolation catalyst can be reacted, heated, or at the temperature of about 50° C. to about 200° C. and for a period of about 4 hr to about 18 hr to produce the phenolated fatty acid. In other specific examples, the mixture of the unsaturated fatty acid, the aromatic alcohol, and the optional phenolation catalyst can be reacted, heated, or at the temperature of about 80° C. to about 130° C. and for a period of about 6 hr to about 15 hr to produce the phenolated fatty acid.

The phenolated fatty acids can be reacted with one or more coupling reagents to produce one or more phenolated fatty acid diesters, as illustrated in Schematic (II).

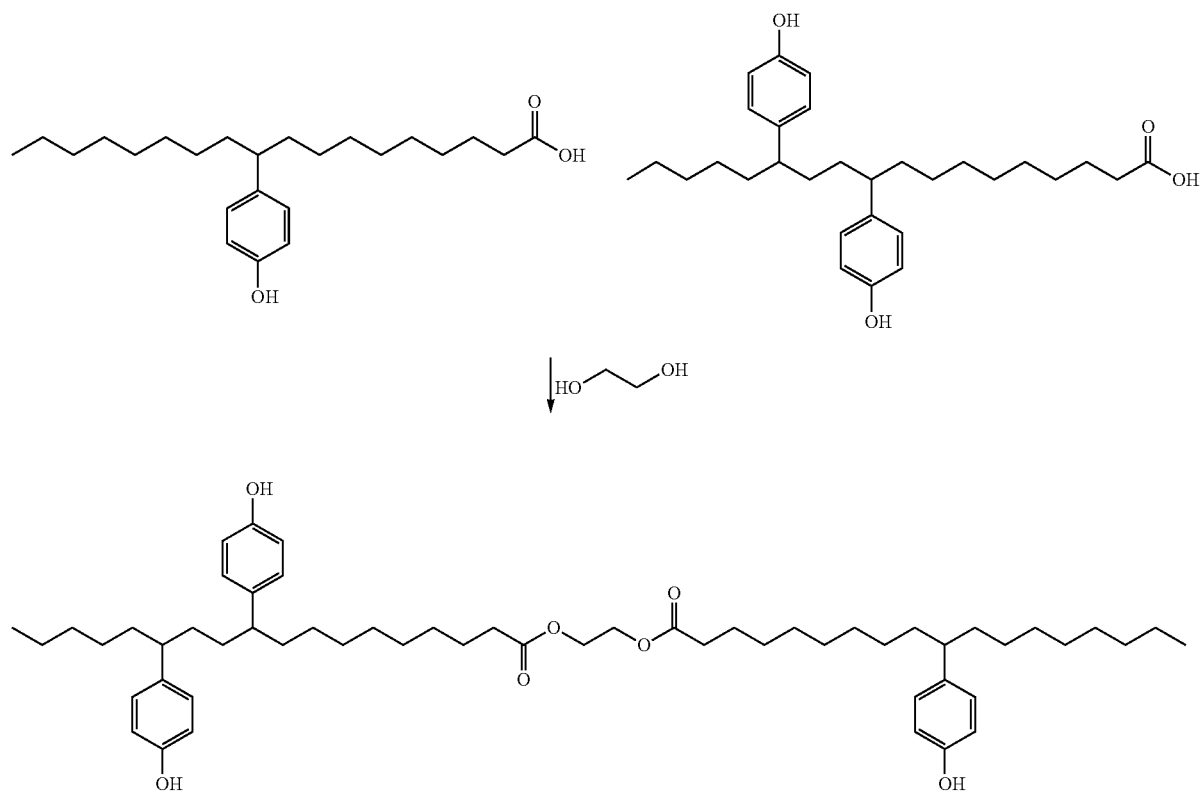

For illustrative purposes only, Schematic (II) depicts that the coupling reagent can be or include ethylene glycol and can be reacted or coupled with two phenolated fatty acid molecules to produce a phenolated fatty acid diester. It should be noted, however, that the coupling reagent can be or include one or more polyols and the product can be or include one or more phenolated fatty acid polyesters. For example, the coupling reagent can be or include, but is not limited to, ethylene glycol, propylene glycol, butylene glycol, polyethylene glycol, polypropylene glycol, glycerol, trimethylolpropane, pentaerythritol, polyether polyols, polyester polyols, isomers thereof, ethers thereof, or any mixture thereof. The phenolated fatty acid polyesters can be or include, but are not limited to, phenolated fatty acid diesters, phenolated fatty acid triesters, phenolated fatty acid tetraesters, polyesters with five or more phenolated fatty acids, or any mixture thereof.

The number of coupling groups (e.g., hydroxyl, carboxylic, or ester groups) disposed on the coupling reagent can be one variable for controlling the number of phenolated fatty acid motifs that can be coupled together with the coupling reagent. For example, ethylene glycol and propylene glycol each have two hydroxyl groups and therefore each molecule of ethylene glycol or propylene glycol can be reacted or coupled with two phenolated fatty acid molecules to produce phenolated fatty acid diesters. In other examples, glycerol and trimethylolpropane each have three hydroxyl groups and therefore each molecule of glycerol or trimethylolpropane can be reacted or coupled with three phenolated fatty acid molecules to produce phenolated fatty acid triesters. In other examples, pentaerythritol has four hydroxyl groups and therefore each molecule of pentaerythritol can be reacted or coupled with four phenolated fatty acid molecules to produce phenolated fatty acid tetraesters.

The coupling reagent can be combined and/or reacted with the phenolated fatty acid in an amount of about 1 wt %, about 2 wt %, about 3 wt %, or about 4 wt % to about 5 wt %, about 6 wt %, about 7 wt %, about 8 wt %, about 9 wt %, about 10 wt %, about 15 wt %, about 20 wt %, or greater, based on a combined weight of the phenolated fatty acid and the coupling reagent. For example, the coupling reagent can be combined and/or reacted with the phenolated fatty acids in an amount of about 1 wt % to about 20 wt %, about 1 wt % to about 10 wt %, about 2 wt % to about 9 wt %, about 3 wt % to about 7 wt %, or about 4 wt % to about 6 wt %, based on a combined weight of the phenolated fatty acid and the coupling reagent.

In some examples, the one or more phenolated fatty acids and the one or more coupling reagents can be in the presence of one or more esterification catalysts to produce the one or more phenolated fatty acid diesters or other phenolated fatty acid polyesters. The esterification catalyst can be or include, but is not limited to, metal-containing catalysts, sulfuric acid, sulfonic acids, complexes thereof, salts thereof, or any mixture thereof. Illustrative sulfonic acids used as esterification catalysts can be or include any of the sulfonic acids discussed and described above as suitable phenolation catalysts. Illustrative metal-containing catalysts, can be or include, but are not limited to, metal alkoxides, metal oxides, metal halides, organometallic compounds, or any mixture thereof.

The esterification catalyst can be or include one or more metal-containing catalysts including tin compounds and titanium compounds. For example, the esterification catalyst can be or include, but is not limited to, stannous octoate, stannous 2-ethylhexanoate, titanium tetramethoxide, titanium tetraethoxide, titanium tetraisopropoxide, titanium tetrabutoxide, isomers thereof, alkyl derivatives thereof, salts thereof, hydrates thereof, or any mixture thereof. Illustrative tin compounds can be or include, but are not limited to, tin-containing catalysts, tin alkoxides, organotin compounds, tin (II) compounds, tin (IV) compounds, or any mixture thereof. For example, the esterification catalyst can be or include a mixture of stannous octoate and stannous 2-ethylhexanoate, such as the FASCAT® 2003 catalyst, commercially available from PMC Organometallix, Inc. Illustrative titanium compounds can be or include, but are not limited to, titanium-containing catalysts, titanium alkoxides, organotitanium compounds, titanium (II) compounds, titanium (IV) compounds, or any mixture thereof.

The esterification catalyst can be combined with the phenolated fatty acid and the coupling reagent in an amount of about 0.1 wt %, about 0.5 wt %, about 1 wt %, about 2 wt %, or about 3 wt % to about 4 wt %, about 5 wt %, about 6 wt %, about 7 wt %, about 8 wt %, about 9 wt %, about 10 wt %, about 15 wt %, about 20 wt %, or greater, based on a combined weight of the phenolated fatty acid and the coupling reagent. For example, the esterification catalysts can be combined with the phenolated fatty acid and the coupling reagent in an amount of about 0.1 wt % to about 20 wt %, about 0.5 wt % to about 15 wt %, about 1 wt % to about 10 wt %, about 2 wt % to about 9 wt %, about 3 wt % to about 7 wt %, or about 4 wt % to about 6 wt %, based on a combined weight of the phenolated fatty acid and the coupling reagent.

The mixture of the phenolated fatty acid, the coupling reagent, and the optional esterification catalyst can be maintained at ambient temperature or heated to react and produce the phenolated fatty acid diester. The mixture of the phenolated fatty acid, the coupling reagent, and the optional esterification catalyst can be at a temperature of about 20° C., about 23° C., about 25° C., about 30° C., about 40° C., about 50° C., about 60° C., about 70° C., about 80° C., about 90° C., or about 100° C. to about 110° C., about 130° C., about 150° C., about 170° C., about 190° C., about 200° C., about 210° C., about 230° C., about 250° C., about 300° C., or greater to produce the phenolated fatty acid diester. For example, the mixture of the phenolated fatty acid, the coupling reagent, and the optional esterification catalyst can be at a temperature of about 20° C. to about 300° C., about 20° C. to about 250° C., about 20° C. to about 200° C., about 150° C. to about 300° C., about 150° C. to about 250° C., about 150° C. to about 200° C., about 170° C. to about 300° C., about 170° C. to about 250° C., about 170° C. to about 200° C., about 190° C. to about 300° C., about 190° C. to about 250° C., or about 190° C. to about 200° C. to produce the phenolated fatty acid diester.

The phenolated fatty acid, the coupling reagent, and the optional esterification catalyst can be reacted, heated, or at the temperature for a period of about 1 hr, about 2 hr, about 3 hr, about 5 hr, or about 7 hr to about 8 hr, about 10 hr, about 12 hr, about 15 hr, about 20 hr, about 24 hr, about 30 hr or longer to produce the phenolated fatty acid diester. For example, the phenolated fatty acid, the coupling reagent, and the optional esterification catalyst can be reacted, heated, or at the temperature for a period of about 1 hr to about 24 hr, about 1 hr to about 12 hr, about 2 hr to about 12 hr, about 3 hr to about 12 hr, about 5 hr to about 12 hr, about 3 hr to about 9 hr, about 5 hr to about 9 hr, or about 6 hr to about 8 hr to produce the phenolated fatty acid diester.

In some specific examples, the mixture of the phenolated fatty acid, the coupling reagent, and the optional esterification catalyst can be reacted, heated, or at a temperature of about 150° C. to about 300° C. and for a period of about 1 hr to about 12 hr to produce the phenolated fatty acid diester. In other specific examples, the mixture of the phenolated fatty acid, the coupling reagent, and the optional esterification catalyst can be reacted, heated, or at a temperature of about 170° C. to about 240° C. and for a period of about 5 hr to about 9 hr to produce the phenolated fatty acid diester. In other specific examples, the mixture of the phenolated fatty acid, the coupling reagent, and the optional esterification catalyst can be reacted, heated, or at a temperature of about 190° C. to about 220° C. and for a period of about 6 hr to about 8 hr to produce the phenolated fatty acid diester.

The phenolated fatty acid diesters can be reacted with one or more acylation reagents to produce one or more acylated phenolated fatty acid diesters, as illustrated in Schematic (III). The acylated phenolated fatty acid diesters can also be referred to as acetylphenolated fatty acid diesters.

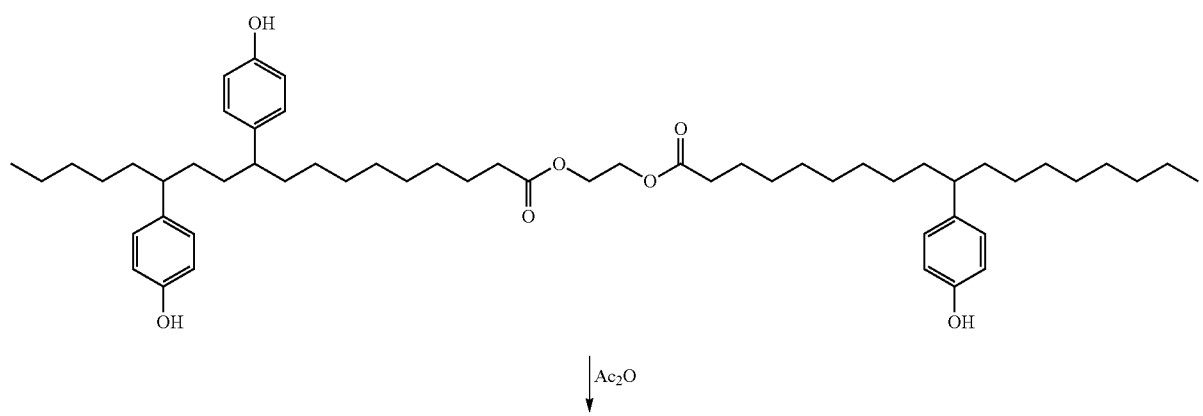

(III)

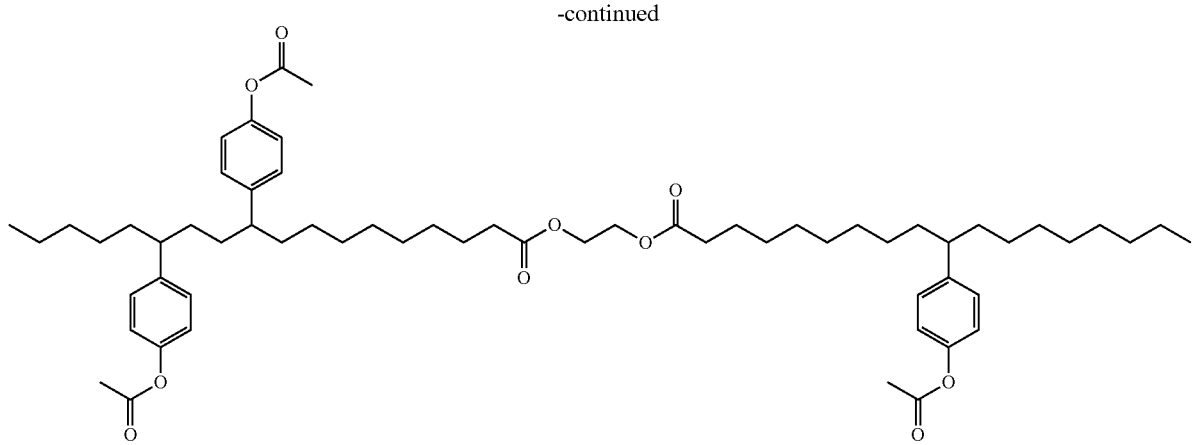

For illustrative purposes only, Schematic (III) depicts that the acylation reagent can be or include acetic anhydride (Ac₂O). It should be noted, however, that the acylation reagent can be or include one or more organic anhydrides, one or more organic acids, or a mixture thereof. For example, the acylation reagent can be or include, but is not limited to, acetic anhydride, acetic acid, acetic chloride, propionic acid, butyric acid, valeric acid, caproic acid, benzoic acid, succinic anhydride, maleic anhydride, succinic acid, maleic acid, fumaric acid, isomers thereof, acids thereof, anhydrides thereof, esters thereof, salts thereof, hydrates thereof, complexes thereof, or any mixture thereof.

The acylation reagent can be combined and/or reacted with the phenolated fatty acid diester in an amount of about 20 wt %, about 30 wt %, about 40 wt %, about 50 wt %, or about 70 wt % to about 90 wt %, about 100 wt %, about 110 wt %, about 120 wt %, about 150 wt %, about 200 wt %, about 250 wt %, about 300 wt %, or greater, based on a combined weight of the phenolated fatty acid diester and the acylation reagent. For example, the acylation reagent can be combined and/or reacted with the phenolated fatty acid diester in an amount of about 20 wt % to about 300 wt %, about 50 wt % to about 200 wt %, about 80 wt % to about 120 wt %, or about 90 wt % to about 110 wt %, based on a combined weight of the phenolated fatty acid diester and the acylation reagent.

In some examples, the phenolated fatty acid diester can be mixed, blended, combined, and/or reacted with the acylation reagent in the presences of one or more acetylation catalysts to produce the acylated phenolated fatty acid diester. The acetylation catalyst can be or include, but is not limited to, pyridine, 4-dimethylaminopyridine, N-bromosuccinimide, salts thereof, hydrates thereof, complexes thereof, halogen derivatives thereof, or any mixture thereof.

The mixture of the phenolated fatty acid diester, the acylation reagent, and the optional acetylation catalyst can be maintained at ambient temperature or heated to react and produce the acylated phenolated fatty acid diester. The mixture of the phenolated fatty acid diester, the acylation reagent, and the optional acetylation catalyst can be at a temperature of about 20° C., about 23° C., about 25° C., about 30° C., about 40° C., about 50° C., about 60° C., about 70° C., about 80° C., or about 90° C. to about 100° C. to about 110° C., about 120° C., about 125° C., about 130° C., about 140° C., about 150° C., about 170° C., about 190° C., about 200° C., about 210° C., about 220° C., or greater to produce the acylated phenolated fatty acid diester. For example, the mixture of the phenolated fatty acid diester, the acylation reagent, and the optional acetylation catalyst can be at a temperature of about 20° C. to about 220° C., about 20° C. to about 200° C., about 20° C. to about 150° C., about 50° C. to about 200° C., about 50° C. to about 150° C., about 50° C. to about 120° C., about 50° C. to about 100° C., about 80° C. to about 200° C., about 80° C. to about 150° C., about 80° C. to about 120° C., or about 80° C. to about 100° C. to produce the acylated phenolated fatty acid diester.

The phenolated fatty acid diester, the acylation reagent, and the optional acetylation catalyst can be reacted, heated, or at the temperature for a period of about 0.2 hr, about 0.5 hr, about 1 hr, about 1.5 hr, or about 2 hr to about 2.5 hr, about 3 hr, about 3.5 hr, about 4 hr, about 5 hr, about 6 hr, about 8 hr, or longer to produce the acylated phenolated fatty acid diester. For example, the phenolated fatty acid diester, the acylation reagent, and the optional acetylation catalyst can be reacted, heated, or at the temperature for a period of about 0.2 hr to about 8 hr, about 0.5 hr to about 8 hr, about 1 hr to about 8 hr, about 2 hr to about 8 hr, about 0.2 hr to about 5 hr, about 0.5 hr to about 5 hr, about 1 hr to about 5 hr, about 2 hr to about 5 hr, about 0.5 hr to about 3 hr, about 1 hr to about 3 hr, or about 2 hr to about 3 hr to produce the acylated phenolated fatty acid diester.

In some specific examples, the mixture of the phenolated fatty acid diester, the acylation reagent, and the optional acetylation catalyst can be reacted, heated, or at the temperature of about 50° C. to about 200° C. and for a period of about 1 hr to about 8 hr to produce the acylated phenolated fatty acid diester. In other specific examples, the mixture of the phenolated fatty acid diester, the acylation reagent, and the optional acetylation catalyst can be reacted, heated, or at the temperature of about 80° C. to about 150° C. and for a period of about 2 hr to about 6 hr to produce the acylated phenolated fatty acid diester. In other specific examples, the mixture of the phenolated fatty acid diester, the acylation reagent, and the optional acetylation catalyst can be reacted, heated, or at the temperature of about 100° C. to about 130° C. and for a period of about 2 hr to about 4 hr to produce the acylated phenolated fatty acid diester.

In other examples, the phenolated fatty acid (as illustrated in Schematic (I)) can be reacted with one or more capping reagents to produce one or more phenolated fatty acid monoesters, as illustrated in Schematic (IV).

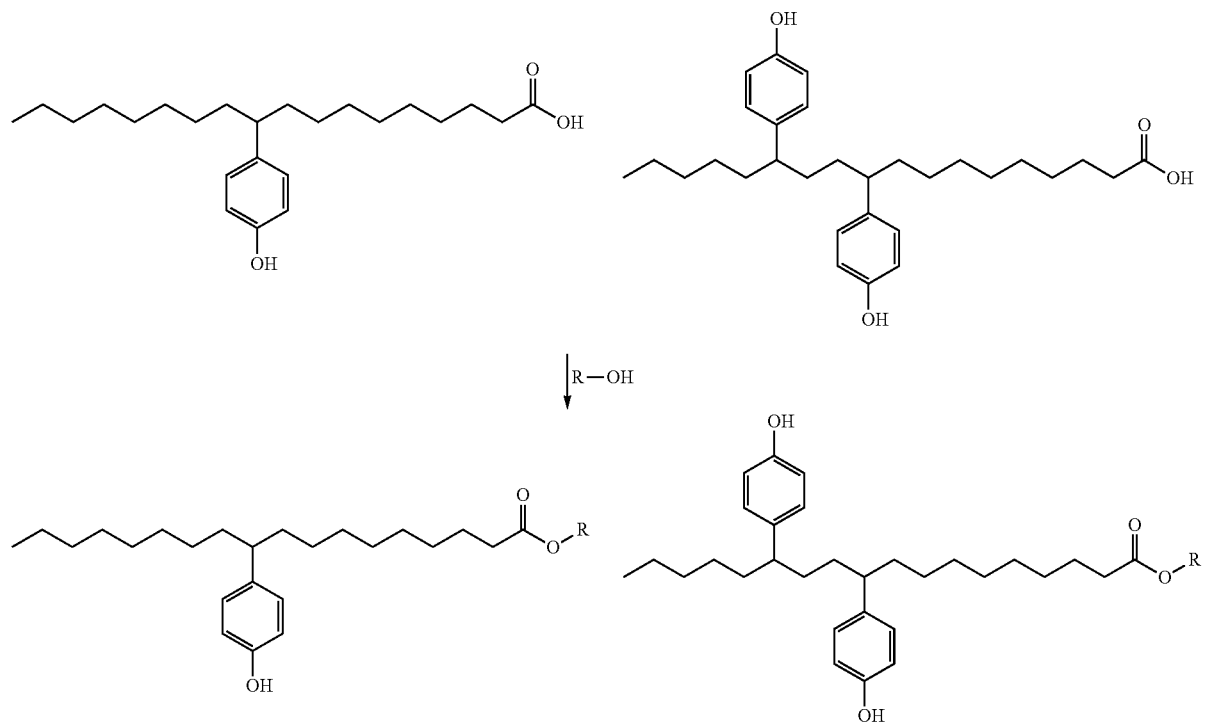

(IV)

Schematic (IV) depicts that the capping reagent can be or include one or more alcohols ROH, where R can be or include, but is not limited to, a substituted or unsubstituted linear, branched, cyclic, heterocyclic, or aromatic hydrocarbyl group. R can be alkyl (e.g., $C_1$-$C_{24}$, $C_1$-$C_{18}$, or $C_1$-$C_{12}$), alkenyl, alkynyl, phenyl, aryl, alkanol, alkoxyl, amino, isomer thereof, or derivative thereof. In some examples, R can be methyl, ethyl, propyl, butyl, pentyl, hexyl, heptyl, octyl, nonyl, decyl, phenyl, or isomers thereof. In at least one example, R can be phenyl. Illustrative capping reagents can be or include, but are not limited to, methanol, ethanol, butanol, pentanol, phenol, hexanol, 2-ethylhexanol, heptanol, octanol, nonanol, isononanol, decanol, isodecanol, benzyl alcohol, isomers thereof, salts thereof, ethers thereof, or any mixture thereof. In at least one example, the capping reagent can be phenol.

The capping reagent can be combined and/or reacted with the phenolated fatty acid in an amount of about 1 wt %, about 2 wt %, about 3 wt %, or about 4 wt % to about 5 wt %, about 6 wt %, about 7 wt %, about 8 wt %, about 9 wt %, about 10 wt %, about 15 wt %, about 20 wt %, or greater, based on a combined weight of the phenolated fatty acid and the capping reagent. For example, the capping reagent can be combined and/or reacted with the phenolated fatty acid in an amount of about 1 wt % to about 20 wt %, about 1 wt % to about 10 wt %, about 2 wt % to about 9 wt %, about 3 wt % to about 7 wt %, or about 4 wt % to about 6 wt %, based on a combined weight of the phenolated fatty acid and the capping reagent.

In some examples, the phenolated fatty acid and the capping reagent can be in the presence of one or more esterification catalysts to produce the phenolated fatty acid monoesters. The esterification catalyst can be or include, but is not limited to, metal-containing catalysts, sulfuric acid, sulfonic acids, complexes thereof, salts thereof, or any mixture thereof. Illustrative sulfonic acids used as esterification catalysts can be or include any of the sulfonic acids discussed and described above as phenolation catalysts. Illustrative metal-containing catalysts, can be or include, but is not limited to, metal alkoxides, metal oxides, metal halides, organometallic compounds, or any mixture thereof.

The esterification catalyst can be or include one or more metal-containing catalysts including tin compounds and titanium compounds. The esterification catalyst can be or include, but is not limited to, stannous octoate, stannous 2-ethylhexanoate, titanium tetramethoxide, titanium tetraethoxide, titanium tetraisopropoxide, titanium tetrabutoxide, isomers thereof, alkyl derivatives thereof, salts thereof, hydrates thereof, or any mixture thereof. Illustrative tin compounds can be or include, but is not limited to, tin-containing catalysts, tin alkoxides, organotin compounds, tin (II) compounds, tin (IV) compounds, or any mixture thereof. For example, the esterification catalyst can be or include a mixture of stannous octoate and stannous 2-ethylhexanoate, such as the FASCAT® 2003 catalyst, commercially available from PMC Organometallix, Inc. Illustrative titanium compounds can be or include, but is not limited to, titanium-containing catalysts, titanium alkoxides, organotitanium compounds, titanium (II) compounds, titanium (IV) compounds, or any mixture thereof.

The esterification catalysts can be combined with the phenolated fatty acid and the capping reagent in an amount of about 0.1 wt %, about 0.5 wt %, about 1 wt %, about 2 wt %, or about 3 wt % to about 4 wt %, about 5 wt %, about 6 wt %, about 7 wt %, about 8 wt %, about 9 wt %, about 10 wt %, about 15 wt %, about 20 wt %, or greater, based on a combined weight of the phenolated fatty acid and the capping reagent. For example, the esterification catalysts can be combined with the phenolated fatty acid and the capping reagent in an amount of about 0.1 wt % to about 20 wt %, about 0.5 wt % to about 15 wt %, about 1 wt % to about 10 wt %, about 2 wt % to about 9 wt %, about 3 wt % to about 7 wt %, or about 4 wt % to about 6 wt %, based on a combined weight of the phenolated fatty acid and the capping reagent.

The mixture of the phenolated fatty acid, the capping reagent, and the optional esterification catalyst can be maintained at ambient temperature or heated to react and produce the phenolated fatty acid monoester. The mixture of the phenolated fatty acid, the capping reagent, and the optional esterification catalyst can be at a temperature of about 20° C., about 23° C., about 25° C., about 30° C., about 40° C., about 50° C., about 60° C., about 70° C., about 80° C., about 90° C., or about 100° C. to about 110° C., about 130° C., about 150° C., about 170° C., about 190° C., about 200° C., about 210° C., about 230° C., about 250° C., about 300° C., or greater to produce the phenolated fatty acid monoester. For example, the mixture of the phenolated fatty acid, the capping reagent, and the optional esterification catalyst can be at a temperature of about 20° C. to about 300° C., about 20° C. to about 250° C., about 20° C. to about 200° C., about 150° C. to about 300° C., about 150° C. to about 250° C., about 150° C. to about 200° C., about 170° C. to about 300° C., about 170° C. to about 250° C., about 170° C. to about 200° C., about 190° C. to about 300° C., about 190° C. to about 250° C., or about 190° C. to about 200° C. to produce the phenolated fatty acid monoester.

The phenolated fatty acid, the capping reagent, and the optional esterification catalyst can be reacted, heated, or at the temperature for a period of about 1 hr, about 2 hr, about 3 hr, about 5 hr, or about 7 hr to about 8 hr, about 10 hr, about 12 hr, about 15 hr, about 20 hr, about 24 hr, about 30 hr or longer to produce the phenolated fatty acid monoester. For example, the phenolated fatty acid, the capping reagent, and the optional esterification catalyst can be reacted, heated, or at the temperature for a period of about 1 hr to about 24 hr, about 1 hr to about 12 hr, about 2 hr to about 12 hr, about 3 hr to about 12 hr, about 5 hr to about 12 hr, about 3 hr to about 9 hr, about 5 hr to about 9 hr, or about 6 hr to about 8 hr to produce the phenolated fatty acid monoester.

In some specific examples, the mixture of the phenolated fatty acid, the capping reagent, and the optional esterification catalyst can be reacted, heated, or at the temperature of about 150° C. to about 300° C. and for a period of about 1 hr to about 12 hr to produce the phenolated fatty acid monoester. In other specific examples, the mixture of the phenolated fatty acid, the capping reagent, and the optional esterification catalyst can be reacted, heated, or at the temperature of about 170° C. to about 240° C. and for a period of about 5 hr to about 9 hr to produce the phenolated fatty acid monoester. In other specific examples, the mixture of the phenolated fatty acid, the capping reagent, and the optional esterification catalyst can be reacted, heated, or at the temperature of about 190° C. to about 220° C. and for a period of about 6 hr to about 8 hr to produce the phenolated fatty acid monoester.

The phenolated fatty acid monoesters can be reacted with one or more acylation reagents to produce one or more acylated phenolated fatty acid monoesters, as illustrated in Schematic (V). The acylated phenolated fatty acid monoesters can also be referred to as acetylphenolated fatty acid monoesters.

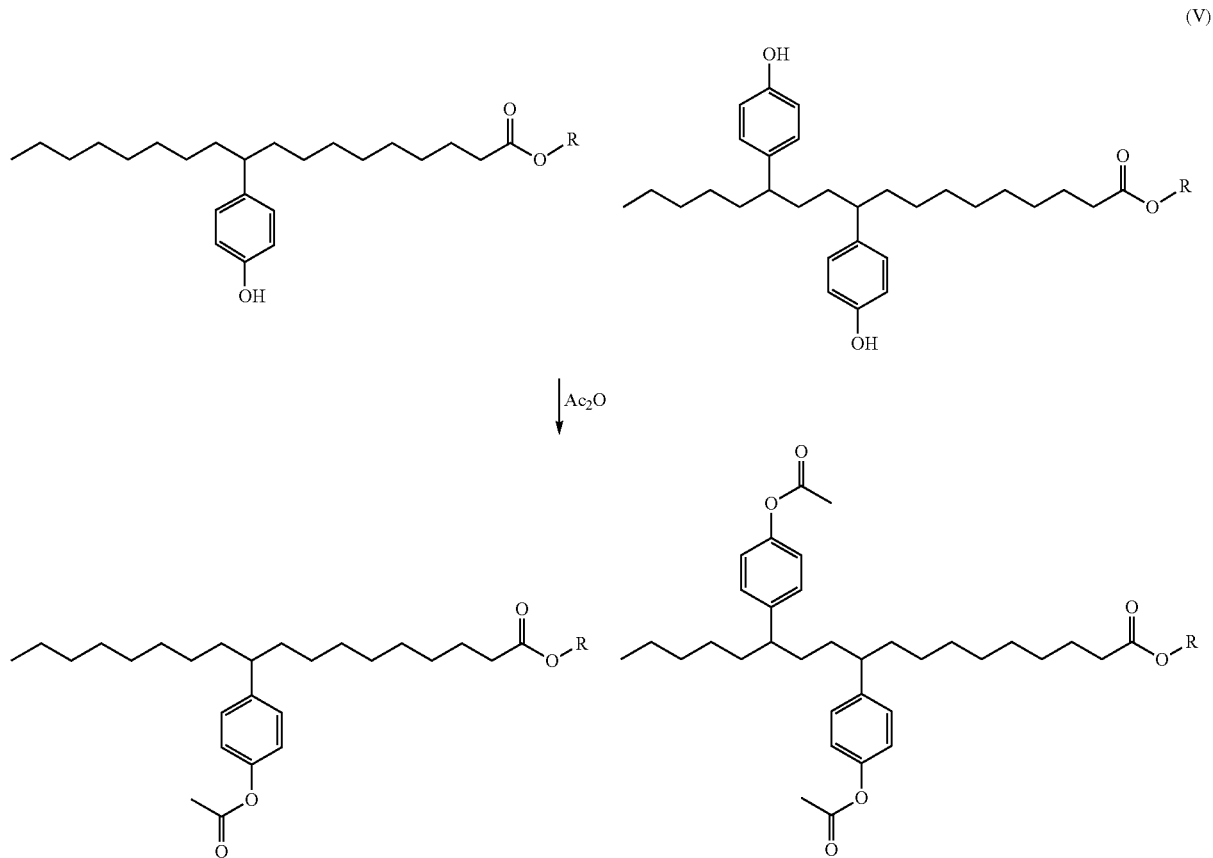

(V)

For illustrative purposes only, Schematic (V) depicts that the acylation reagent can be or include acetic anhydride (Ac$_2$O). It should be noted, however, that the acylation reagent can be or include one or more organic anhydrides, one or more organic acids, or a mixture thereof. The acylation reagent can be or include, but is not limited to, acetic anhydride, acetic acid, acetic chloride, propionic acid, butyric acid, valeric acid, caproic acid, benzoic acid, succinic anhydride, maleic anhydride, succinic acid, maleic acid, fumaric acid, isomers thereof, acids thereof, anhydrides thereof, esters thereof, salts thereof, hydrates thereof, complexes thereof, or any mixture thereof.

The acylation reagent can be combined and/or reacted with the phenolated fatty acid monoester in an amount of about 20 wt %, about 30 wt %, about 40 wt %, about 50 wt %, or about 70 wt % to about 90 wt %, about 100 wt %, about 110 wt %, about 120 wt %, about 150 wt %, about 200 wt %, about 250 wt %, about 300 wt %, or greater, based on a combined weight of the phenolated fatty acid monoester and the acylation reagent. For example, the acylation reagent can be combined and/or reacted with the phenolated fatty acid monoester in an amount of about 20 wt % to about 300 wt %, about 50 wt % to about 200 wt %, about 80 wt % to about 120 wt %, or about 90 wt % to about 110 wt %, based on a combined weight of the phenolated fatty acid monoester and the acylation reagent.

In some examples, the phenolated fatty acid monoester can be mixed, blended, combined, and/or reacted with the acylation reagent in the presences of one or more acetylation catalysts to produce the acylated phenolated fatty acid monoester. The acetylation catalyst can be or include, but is not limited to, pyridine, 4-dimethylaminopyridine, N-bromosuccinimide, salts thereof, hydrates thereof, complexes thereof, halogen derivatives thereof, or any mixture thereof.

The mixture of the phenolated fatty acid monoester, the acylation reagent, and the optional acetylation catalyst can be maintained at ambient temperature or heated to react and produce the phenolated fatty acid monoester. The mixture of the phenolated fatty acid monoester, the acylation reagent, and the optional acetylation catalyst can be at a temperature of about 20° C., about 23° C., about 25° C., about 30° C., about 40° C., about 50° C., about 60° C., about 70° C., about 80° C., or about 90° C. to about 100° C. to about 110° C., about 120° C., about 125° C., about 130° C., about 140° C., about 150° C., about 170° C., about 190° C., about 200° C., about 210° C., about 220° C., or greater to produce the acylated phenolated fatty acid monoester. For example, the mixture of the phenolated fatty acid monoester, the acylation reagent, and the optional acetylation catalyst can be at a temperature of about 20° C. to about 220° C., about 20° C. to about 200° C., about 20° C. to about 150° C., about 50° C. to about 200° C., about 50° C. to about 150° C., about 50° C. to about 120° C., about 50° C. to about 100° C., about 80° C. to about 200° C., about 80° C. to about 150° C., about 80° C. to about 120° C., or about 80° C. to about 100° C. to produce the acylated phenolated fatty acid monoester.

The phenolated fatty acid monoester, the acylation reagent, and the optional acetylation catalyst can be reacted, heated, or at the temperature for a period of about 0.2 hr, about 0.5 hr, about 1 hr, about 1.5 hr, or about 2 hr to about 2.5 hr, about 3 hr, about 3.5 hr, about 4 hr, about 5 hr, about 6 hr, about 8 hr, or longer to produce the acylated phenolated fatty acid monoester. For example, the phenolated fatty acid monoester, the acylation reagent, and the optional acetylation catalyst can be reacted, heated, or at the temperature for a period of about 0.2 hr to about 8 hr, about 0.5 hr to about 8 hr, about 1 hr to about 8 hr, about 2 hr to about 8 hr, about 0.2 hr to about 5 hr, about 0.5 hr to about 5 hr, about 1 hr to about 5 hr, about 2 hr to about 5 hr, about 0.5 hr to about 3 hr, about 1 hr to about 3 hr, or about 2 hr to about 3 hr to produce the acylated phenolated fatty acid monoester.

In some specific examples, the mixture of the phenolated fatty acid monoester, the acylation reagent, and the optional acetylation catalyst can be reacted, heated, or at the temperature of about 50° C. to about 200° C. and for a period of about 1 hr to about 8 hr to produce the acylated phenolated fatty acid monoester. In other specific examples, the mixture of the phenolated fatty acid monoester, the acylation reagent, and the optional acetylation catalyst can be reacted, heated, or at the temperature of about 80° C. to about 150° C. and for a period of about 2 hr to about 6 hr to produce the acylated phenolated fatty acid monoester. In other specific examples, the mixture of the phenolated fatty acid monoester, the acylation reagent, and the optional acetylation catalyst can be reacted, heated, or at the temperature of about 100° C. to about 130° C. and for a period of about 2 hr to about 4 hr to produce the acylated phenolated fatty acid monoester.

As noted above, the polymer can be or include, but is not limited to, one or more polyvinyl chlorides (PVCs), one or more polyvinylidene chlorides (PVDCs), one or more cellulose esters, one or more cellulose ethers, one or more cellulose nitrates, one or more polyacrylates, one or more polyurethanes, one or more copolymers thereof, or any mixture thereof. Suitable polyvinyl chlorides can include homopolymers and copolymers of vinyl chloride. In some examples, copolymers of vinyl chloride can include, e.g., from about 1 wt % to about 20 wt % of one or more monomers such as vinyl acetate, propylene, ethylene, diethyl maleate, dimethyl fumarate, and/or other ethylenically unsaturated monomers covered. In other examples, the polymer can be or include a copolymer of vinyl chloride and vinylidene chloride, vinyl acetate, vinyl propionate, vinyl butyrate, vinyl benzoate, methyl acrylate, ethyl acrylate, butyl acrylate, or any combination thereof. Other vinyl chloride resins can include, but are not limited to, chlorinated polyvinyl chloride, chlorinated polyethylene, vinyl chloride-vinyl acetate copolymers, vinyl chloride-ethylene copolymers, vinyl chloride-propylene copolymers, vinyl chloride-styrene copolymers, vinyl chloride-isobutylene copolymers, vinyl chloride-vinylidene chloride copolymers, vinyl chloride-styrene-maleic anhydride terpolymers, vinyl chloride-styrene-acrylonitrile copolymers, vinyl chloride-butadiene copolymers, vinyl chloride-isoprene copolymers, vinyl chloride-chlorinated propylene copolymers, vinyl chloride-vinylidene chloride-vinyl acetate terpolymers, vinyl chloride-maleate copolymers, vinyl chloride-methacrylate copolymers, vinyl chloride-acrylonitrile copolymers, vinyl chloride-vinyl ether copolymers, or any mixture thereof.

Illustrative cellulose esters can be or include, but are not limited to, cellulose acetate (CA), cellulose triacetate, cellulose acetate propionate (CAP), cellulose acetate butyrate (CAB), cellulose propionate, cellulose sulfate, or any mixture thereof. Illustrative cellulose ethers can be or include, but are not limited to, methylcellulose, ethylcellulose, ethyl methyl cellulose, hydroxyethyl cellulose, hydroxypropyl cellulose, hydroxyethyl methyl cellulose, hydroxypropyl methyl cellulose, ethyl hydroxyethyl cellulose, carboxymethyl cellulose, or any mixture thereof.

EXAMPLES

In order to provide a better understanding of the foregoing discussion, the following non-limiting examples are offered.

Although the examples can be directed to specific embodiments, they are not to be viewed as limiting the invention in any specific respect.

Example 1: Preparation of an Acylated Phenolated Fatty Acid Diester Plasticizer To a 250 mL 3-neck flask was added phenol (about 48.1 g, 0.512 mol), XTOL® 100 tall oil fatty acids (about 50 g, about 0.179 mol) and AMBERLYST® 15 catalyst (about 5 g). After the flask was degassed and filled with nitrogen, the mixture was stirred at about 110° C. overnight. The reaction mixture was vacuum distilled to remove excess amount of phenol. The distillation residue containing phenolated TOFA was mixed with ethylene glycol (about 5.5 g, about 0.0887 mol) and FASCAT® 2003 catalyst (about 0.08 g) to esterify carboxylic acid. The esterification reaction was carried out at a temperature of about 190° C. to about 220° C. for about 7 hours. The reaction mixture was then put under vacuum at about 10 Torr to about 20 Torr to distill off water. After distillation, acetic anhydride (about 100 g, about 0.98 mol) was added to the reaction flask. The flask was heated to about 125° C. and acetylation reaction was run for about 3 hours. The reaction mixture was distilled to remove acetic acid and excess amount of acetic anhydride. The final product was analyzed and characterized by NMR and IR to be acylated TOFA phenol ethylene glycol ester ("phenolated TOFA ester").

Example 2: Properties of Poly(Vinyl Chloride) Plasticized with the Acylated Phenolated Fatty Acid Diester Plasticizer Phenolated TOFA plasticizer (sample from Ex. 1) and PVC were each dissolved in THF to make about 10 wt % solutions. The plasticizer and PVC solutions were mixed at about 20:80 and about 40:60 weight ratios. The solution mixtures were casted onto glass slides to make solution films. The films were air dried overnight, and further vacuum dried in a vacuum oven at a temperature of about 60° C. to about 70° C. for about 3 hr. The films were then analyzed by DSC and TGA and the results shown are shown in Table 1 below.

Comparative and Control Examples

An unplasticized PVC was measured as a control example. The unplasticized PVC was dissolved in THF to make about a 10 wt % solution. The solution was casted onto a glass slide to make a solution film. The film was air dried overnight, and further vacuum dried in a vacuum oven at a temperature of about 60° C. to about 70° C. for about 3 hr.

For the comparative example, an adipate polyester (PARAPLEX® G-25, acquired from Hallstar) and PVC were each dissolved in THF to make about 10 wt % solutions. The plasticizer and PVC solutions were mixed at about 20:80 and about 40:60 weight rations. The solution mixtures were casted onto glass slides to make solution films. The films were air dried overnight, and further vacuum dried in a vacuum oven at a temperature of about 60° C. to about 70° C. for about 3 hr. The unplasticized PVC and the comparative films were then analyzed by DSC and TGA and the results shown are shown in Table 1 below.

TABLE 1

| Ex. | Plasticizer | Tg (plasticizer at about 20 wt %) | Tg (plasticizer at about 40 wt %) |
|---|---|---|---|
| Ex. 2 | phenolated TOFA ester | about 41° C. | about −7° C. |
| Comparative Example | PARAPLEX® G-25 | about 29° C. | about −4° C. |
| Control | Unplasticized PVC's $T_g$: about 78° C. | | |

Examples 3-5

Preparation of Phenolated Fatty Acid Monoester Precursors

To a 250 mL 3-neck flask was added varying amounts of phenol, varying amounts of XTOL® 100 tall oil fatty acids, and varying types and amounts of catalyst. After addition of the phenol, tall oil fatty acids, and catalyst, the flasks were degassed and filled with nitrogen, and the mixture was stirred for about 5 hours at varying temperatures. The reaction mixture was vacuum distilled to remove excess amount of phenol. The amounts of phenol, XTOL® 100 tall oil fatty acids, catalyst, mount of catalyst, and reaction temperature are shown in Table 2 below.

TABLE 2

| Ex. | Amount of Phenol (g) | Amount of XTOL® 100 (g) | Type of Catalyst | Amount of Catalyst (g) | Set Reaction Temperature (° C.) |
|---|---|---|---|---|---|
| 3 | 48.1 | 50 | AMBERLYST® 36 | 5.0 | 140 |
| 4 | 77.0 | 80 | Methanesulfonic acid | 0.11 | 150 |
| 5 | 96.2 | 40 | AMBERLYST® 35 | 5.0 | 140 |

The reaction products produced in Examples 3, 4 and 5 were analyzed by NMR and MS. The analyses showed the phenolation of the tall oil fatty acid and the esterification of the carboxylic acid moiety of the tall oil fatty acid with phenol.

Embodiments of the present disclosure further relate to any one or more of the following paragraphs:

1. A method for making a plasticizer, comprising: reacting an unsaturated fatty acid with an aromatic alcohol to produce a phenolated fatty acid; reacting the phenolated fatty acid with a coupling reagent to produce a phenolated fatty acid diester; and reacting the phenolated fatty acid diester with an acylation reagent to produce an acylated phenolated fatty acid diester.

2. A method for making a plasticizer, comprising: reacting an unsaturated fatty acid with an aromatic alcohol in the presence of a phenolation catalyst to produce a phenolated fatty acid; reacting the phenolated fatty acid with a coupling reagent in the presence of an esterification catalyst to produce a phenolated fatty acid diester; and reacting the phenolated fatty acid diester with an acylation reagent to produce an acylated phenolated fatty acid diester.

3. A method for making a plasticizer, comprising: reacting an unsaturated fatty acid with an aromatic alcohol to produce a phenolated fatty acid; reacting the phenolated fatty acid with a capping reagent to produce a phenolated fatty acid monoester; and reacting the phenolated fatty acid monoester with an acylation reagent to produce an acylated phenolated fatty acid monoester.

4. A method for making a plasticizer, comprising: reacting an unsaturated fatty acid with an aromatic alcohol in the presence of a phenolation catalyst to produce a phenolated fatty acid; reacting the phenolated fatty acid with a capping reagent in the presence of an esterification catalyst to produce a phenolated fatty acid monoester; and reacting the phenolated fatty acid monoester with an acylation reagent to produce an acylated phenolated fatty acid monoester.

5. The method according to any one of paragraphs 1 to 4, wherein the unsaturated fatty acid and the aromatic alcohol are reacted at a temperature of about 20° C. to about 250° C. for a period of about 2 hours to about 24 hours to produce the phenolated fatty acid.

6. The method according to paragraph 1 or 2, wherein the phenolated fatty acid and the coupling reagent are reacted at a temperature of about 150° C. to about 300° C. for a period of about 1 hour to about 12 hours to produce the phenolated fatty acid diester.

7. The method according to paragraph 3 or 4, wherein the phenolated fatty acid and the capping reagent are reacted at a temperature of about 150° C. to about 300° C. for a period of about 1 hour to about 12 hours to produce the phenolated fatty acid monoester.

8. The method according to any one of paragraphs 1 to 7, wherein the unsaturated fatty acid comprises tall oil fatty acids, soybean oil, canola oil, vegetable oil, corn oil, sunflower oil, flaxseed oil, sesame oil, olive oil, peanut oil, cottonseed oil, safflower oil, rape seed oil, or any mixture thereof.

9. The method according to any one of paragraphs 1 to 8, wherein the unsaturated fatty acid comprises oleic acid, eicosenoic acid, erucic acid, nervonic acid, linoleic acid, rumenic acid, eicosadienoic acid, docosadienoic acid, linolenic acid, eicosatrienoic acid, arachidonic acid, docosatetraenoic acid, docosapentaenoic acid, docosahexaenoic acid, isomers thereof, salts thereof, esters thereof, or any mixture thereof.

10. The method according to any one of paragraphs 1 to 9, wherein the aromatic alcohol comprises phenol, naphthol, cresol, xylenol, guaiacol, bisphenol A (BPA), polyphenol, isomers thereof, or any mixture thereof.

11. The method according to any one of paragraphs 1 to 10, wherein the phenolation catalyst comprises a Brønsted acid or a Lewis acid.

12. The method according to any one of paragraphs 1 to 11, wherein the phenolation catalyst comprises sulfuric acid, sulfonic acid, polymeric sulfonic acid catalyst, methanesulfonic acid, trifluoromethanesulfonic acid, p-toluenesulfonic acid, phosphoric acids, orthophosphoric acid, metaphosphoric acid, pyrophosphoric acid, isomers thereof, salts thereof, or any mixture thereof.

13. The method according to any one of paragraphs 1 to 12, wherein the phenolation catalyst comprises boron trifluoride, aluminum chloride, zinc chloride, iron chloride, tin chloride, titanium chloride, halides thereof, complexes thereof, salts thereof, or any mixture thereof.

14. The method according to paragraph 1 or 2, wherein the coupling reagent comprises ethylene glycol, propylene glycol, butylene glycol, polyethylene glycol, polypropylene glycol, glycerol, trimethylolpropane, pentaerythritol, isomers thereof, salts thereof, ethers thereof, or any mixture thereof.

15. The method according to any one of paragraphs 1 to 14, wherein the acylation reagent comprises acetic anhydride, acetic acid, acetic chloride, propionic acid, butyric acid, valeric acid, caproic acid, benzoic acid, succinic anhydride, maleic anhydride, succinic acid, maleic acid, fumaric acid, isomers thereof, salts thereof, esters thereof, or any mixture thereof.

16. The method according to any one of paragraphs 1 to 15, wherein the esterification catalyst comprises stannous octoate, stannous 2-ethylhexanoate, titanium tetraisopropoxide, titanium tetrabutoxide, sulfuric acid, methanesulfonic acid, trifluoromethanesulfonic acid, p-toluenesulfonic acid, dodecylbenzenesulfonic acid, taurine, polymeric sulfonic acids, polymeric perfluorosulfonic acids, sulfonated tetrafluoroethylene-based fluoropolymer materials, isomers thereof, salts thereof, or any mixture thereof.

17. The method according to paragraph 3 or 4, wherein the capping reagent comprises methanol, ethanol, butanol, pentanol, phenol hexanol, 2-ethylhexanol, heptanol, octanol, nonanol, isononanol, decanol, isodecanol, isomers thereof, salts thereof, ethers thereof, or any mixture thereof.

18. A plasticizer produced by the method according to any one of paragraphs 1 to 17.

19. A method for making a plastic composition, comprising combining a polymer and the plasticizer produced by the method according to any one of paragraphs 1 to 17 to produce a plastic composition.

20. The method of paragraph 19, wherein a mixture of the polymer and the plasticizer is extruded in a screw extruder.

21. The method of paragraph 19, wherein a molten mixture of the polymer and the plasticizer is extruded in a screw extruder.

22. The method of paragraph 19, wherein the polymer and the plasticizer are blended with a roll mill.

23. The method of paragraph 19, wherein the polymer comprises polyvinyl chloride (PVC), polyvinylidene chloride (PVDC), cellulose esters, cellulose ethers, cellulose nitrates, polyacrylates, or any mixture thereof.

24. The method of paragraph 19, wherein the plastic composition comprises the plasticizer in an amount of about 10 wt % to about 60 wt %, based on a combined weight of the plasticizer and the polymer.

25. The method of paragraph 19, wherein the plastic composition comprises the plasticizer in an amount of about 20 wt % to about 40 wt %, based on a combined weight of the plasticizer and the polymer.

26. A plastic composition, comprising the plastic composition produced by the method according to any one of paragraphs 19 to 25.

27. A plasticizer comprising an acylated phenolated fatty acid monoester.

28. A plasticizer comprising an acylated phenolated fatty acid diester.

29. A plasticizer comprising a mixture of an acylated phenolated fatty acid monoester and an acylated phenolated fatty acid diester.

30. The plasticizer according to paragraph 27 or 29, wherein: the acylated phenolated fatty acid monoester is produced by reacting a phenolated fatty acid monoester with an acylation reagent, the phenolated fatty acid monoester is produced by reacting a phenolated fatty acid with a capping reagent, and the phenolated fatty acid is produced by reacting an unsaturated fatty acid with an aromatic alcohol.

31. The plasticizer according to paragraph 30, wherein the acylation reagent comprises acetic anhydride, acetic acid, acetic chloride, propionic acid, butyric acid, valeric acid, caproic acid, benzoic acid, succinic anhydride, maleic anhydride, succinic acid, maleic acid, fumaric acid, or any mixture thereof, the capping reagent comprises methanol, ethanol, butanol, pentanol, phenol, hexanol, 2-ethylhexanol, heptanol, octanol, nonanol, isononanol, decanol, isodecanol, benzyl alcohol, or any mixture thereof, the unsaturated fatty acid comprises a fatty acid derived from a crude tall oil, and the aromatic alcohol comprises phenol, naphthol, cresol, xylenol, guaiacol, bisphenol A, polyphenol, isomers thereof, or any mixture thereof.

32. The plasticizer according to paragraph 28 or 29, wherein the acylated phenolated fatty acid diester is produced by reacting a phenolated fatty acid diester with an acylation reagent, the phenolated fatty acid diester is produced by reacting a phenolated fatty acid with a coupling reagent, and the phenolated fatty acid is produced by reacting an unsaturated fatty acid with an aromatic alcohol.

33. The plasticizer according to paragraph 32, wherein the acylation reagent comprises acetic anhydride, acetic acid, acetic chloride, propionic acid, butyric acid, valeric acid, caproic acid, benzoic acid, succinic anhydride, maleic anhydride, succinic acid, maleic acid, fumaric acid, or any mixture thereof, the coupling reagent comprises ethylene glycol, propylene glycol, butylene glycol, polyethylene glycol, polypropylene glycol, glycerol, trimethylolpropane, pentaerythritol, isomers thereof, salts thereof, ethers thereof, or any mixture thereof, the unsaturated fatty acid comprises a fatty acid derived from a crude tall oil, and the aromatic alcohol comprises phenol, naphthol, cresol, xylenol, guaiacol, bisphenol A, polyphenol, isomers thereof, or any mixture thereof.

34. A plastic composition, comprising: a polymer comprising a polyvinyl chloride, a polyvinylidene chloride, a cellulose ester, a cellulose ether, a cellulose nitrate, a polyacrylate, a polyurethane, a copolymer thereof, or any mixture thereof; and a plasticizer comprising an acylated phenolated fatty acid monoester, an acylated phenolated fatty acid diester, or a mixture thereof, wherein the plastic composition comprises the plasticizer in an amount of about 10 wt % to about 60 wt %, based on a combined weight of the polymer, any acylated phenolated fatty acid monoester, and any acylated phenolated fatty acid diester.

35. The plastic composition according to paragraph 34, wherein the plasticizer comprises the acylated phenolated fatty acid monoester.

36. The plastic composition according to paragraph 34 or 35, wherein: the acylated phenolated fatty acid monoester is produced by reacting a phenolated fatty acid monoester with an acylation reagent, the phenolated fatty acid monoester is produced by reacting a phenolated fatty acid with a capping reagent, and the phenolated fatty acid is produced by reacting an unsaturated fatty acid with an aromatic alcohol.

37. The plastic composition according to paragraph 36, wherein: the acylation reagent comprises acetic anhydride, acetic acid, acetic chloride, propionic acid, butyric acid, valeric acid, caproic acid, benzoic acid, succinic anhydride, maleic anhydride, succinic acid, maleic acid, fumaric acid, or any mixture thereof, the capping reagent comprises methanol, ethanol, butanol, pentanol, phenol, hexanol, 2-ethylhexanol, heptanol, octanol, nonanol, isononanol, decanol, isodecanol, benzyl alcohol, or any mixture thereof, the unsaturated fatty acid comprises a fatty acid derived from a crude tall oil, and the aromatic alcohol comprises phenol, naphthol, cresol, xylenol, guaiacol, bisphenol A, polyphenol, isomers thereof, or any mixture thereof.

38. The plastic composition according to any one of paragraphs 34 to 37, wherein the plastic composition comprises about 30 wt % to about 50 wt % of the plasticizer, based on the combined weight of the polymer and the plasticizer.

39. The plastic composition according to any one of paragraphs 34 to 38, wherein the plasticizer comprises the acylated phenolated fatty acid diester.

40. The plastic composition according to any one of paragraphs 34 to 39, wherein the acylated phenolated fatty acid diester is produced by reacting a phenolated fatty acid diester with an acylation reagent, the phenolated fatty acid diester is produced by reacting a phenolated fatty acid with a coupling reagent, and the phenolated fatty acid is produced by reacting an unsaturated fatty acid with an aromatic alcohol.

41. The plastic composition according to paragraph 40, wherein: the acylation reagent comprises acetic anhydride, acetic acid, acetic chloride, propionic acid, butyric acid, valeric acid, caproic acid, benzoic acid, succinic anhydride, maleic anhydride, succinic acid, maleic acid, fumaric acid, or any mixture thereof, the coupling reagent comprises ethylene glycol, propylene glycol, butylene glycol, polyethylene glycol, polypropylene glycol, glycerol, trimethylolpropane, pentaerythritol, isomers thereof, salts thereof, ethers thereof, or any mixture thereof, the unsaturated fatty acid comprises a fatty acid derived from a crude tall oil, and the aromatic alcohol comprises phenol, naphthol, cresol, xylenol, guaiacol, bisphenol A, polyphenol, isomers thereof, or any mixture thereof.

42. The plastic composition according to any one of paragraphs 34 to 41, wherein the polymer comprises a polyvinyl chloride.

43. The plastic composition according to any one of paragraphs 34 to 42, wherein the polymer comprises a polyvinylidene chloride.

44. The plastic composition according to any one of paragraphs 34 to 43, wherein the polymer comprises a cellulose ester.

45. The plastic composition according to any one of paragraphs 34 to 44, wherein the polymer comprises a cellulose ether.

46. The plastic composition according to any one of paragraphs 34 to 45, wherein the polymer comprises a cellulose nitrate.

47. The plastic composition according to any one of paragraphs 34 to 46, wherein the polymer comprises a polyacrylate.

48. The plastic composition according to any one of paragraphs 34 to 47, wherein the polymer comprises a polyurethane.

49. The plastic composition according to any one of paragraphs 34 to 48, wherein the plasticizer comprises a mixture of the acylated phenolated fatty acid monoester and the acylated phenolated fatty acid diester.

50. A method for making a plasticizer, comprising: reacting an unsaturated fatty acid with an aromatic alcohol to produce a phenolated fatty acid; reacting the phenolated fatty acid with a capping reagent to produce a phenolated fatty acid monoester; and reacting the phenolated fatty acid monoester with an acylation reagent to produce an acylated phenolated fatty acid monoester.

51. The method according to paragraph 50, wherein the unsaturated fatty acid and the aromatic alcohol are reacted in the presence of a phenolation catalyst to produce the phenolated fatty acid.

52. The method according to paragraph 50 or 51, wherein the phenolated fatty acid and the capping reagent are reacted in the presence of an esterification catalyst to produce the phenolated fatty acid monoester.

53. The method according to paragraph 51 or 52, wherein the phenolation catalyst comprises sulfuric acid, sulfonic acid, polymeric sulfonic acid catalyst, methanesulfonic acid, trifluoromethanesulfonic acid, p-toluenesulfonic acid, phosphoric acids, orthophosphoric acid, metaphosphoric acid, pyrophosphoric acid, isomers thereof, salts thereof, or any mixture thereof.

54. The method according to any one of paragraphs 51 to 53, wherein the esterification catalyst comprises stannous octoate, stannous 2-ethylhexanoate, titanium tetraisopropoxide, titanium tetrabutoxide, sulfuric acid, methanesulfonic acid, trifluoromethanesulfonic acid, p-toluenesulfonic acid, dodecylbenzenesulfonic acid, taurine, polymeric sulfonic acids, polymeric perfluorosulfonic acids, sulfonated tetrafluoroethylene-based fluoropolymer materials, isomers thereof, salts thereof, or any mixture thereof.

55. The method according to any one of paragraphs 50 to 54, wherein the unsaturated fatty acid and the aromatic alcohol are reacted at a temperature of about 20° C. to about 250° C. for a period of about 2 hours to about 24 hours to produce the phenolated fatty acid.

56. The method according to any one of paragraphs 50 to 55, wherein the phenolated fatty acid and the capping reagent are reacted at a temperature of about 150° C. to about 300° C. for a period of about 1 hour to about 12 hours to produce the phenolated fatty acid monoester.

57. The method according to any one of paragraphs 50 to 56, wherein the phenolated fatty acid monoester and the acylation reagent are reacted at a temperature of about 60° C. to about 200° C. of a period of about 0.5 hour to about 6 hours.

58. The method according to any one of paragraphs 50 to 57, wherein the aromatic alcohol comprises phenol, naphthol, cresol, xylenol, guaiacol, bisphenol A, polyphenol, isomers thereof, or any mixture thereof.

59. The method according to any one of paragraphs 50 to 58, wherein the unsaturated fatty acid comprises oleic acid, eicosenoic acid, erucic acid, nervonic acid, linoleic acid, rumenic acid, eicosadienoic acid, docosadienoic acid, linolenic acid, eicosatrienoic acid, arachidonic acid, docosatetraenoic acid, docosapentaenoic acid, docosahexaenoic acid, isomers thereof, salts thereof, esters thereof, or any mixture thereof.

60. The method according to any one of paragraphs 50 to 59, wherein the unsaturated fatty acid comprises tall oil fatty acids, soybean oil, canola oil, vegetable oil, corn oil, sunflower oil, flaxseed oil, sesame oil, olive oil, peanut oil, cottonseed oil, safflower oil, rape seed oil, or any mixture thereof.

61. The method according to any one of paragraphs 50 to 60, wherein the capping reagent comprises methanol, ethanol, butanol, pentanol, phenol, hexanol, 2-ethylhexanol, heptanol, octanol, nonanol, isononanol, decanol, isodecanol, benzyl alcohol, or any mixture thereof.

62. The method according to any one of paragraphs 50 to 61, wherein the acylation reagent comprises acetic anhydride, acetic acid, acetic chloride, propionic acid, butyric acid, valeric acid, caproic acid, benzoic acid, succinic anhydride, maleic anhydride, succinic acid, maleic acid, fumaric acid, isomers thereof, salts thereof, esters thereof, or any mixture thereof.

63. The method according to any one of paragraphs 50 to 62, wherein: the aromatic alcohol comprises phenol, naphthol, cresol, xylenol, guaiacol, bisphenol A, polyphenol, isomers thereof, or any mixture thereof, the unsaturated fatty acid comprises tall oil fatty acids, the capping reagent comprises methanol, ethanol, butanol, pentanol, phenol, hexanol, 2-ethylhexanol, heptanol, octanol, nonanol, isononanol, decanol, isodecanol, benzyl alcohol, or any mixture thereof, and the acylation reagent comprises acetic anhydride, acetic acid, acetic chloride, propionic acid, butyric acid, valeric acid, caproic acid, benzoic acid, succinic anhydride, maleic anhydride, succinic acid, maleic acid, fumaric acid, isomers thereof, salts thereof, esters thereof, or any mixture thereof.

64. The method according to any one of paragraphs 50 to 63, wherein the aromatic alcohol comprises phenol.

65. The method according to any one of paragraphs 50 to 64, wherein the unsaturated fatty acid comprises tall oil fatty acids.

66. The method according to any one of paragraphs 50 to 65, wherein the unsaturated fatty acid is derived entirely from crude tall oil.

67. A method for making a plasticizer, comprising: reacting an unsaturated fatty acid with an aromatic alcohol to produce a phenolated fatty acid; reacting the phenolated fatty acid with a coupling reagent to produce a phenolated fatty acid diester; and reacting the phenolated fatty acid diester with an acylation reagent to produce an acylated phenolated fatty acid diester.

68. The method according to paragraph 67, wherein the unsaturated fatty acid comprises tall oil fatty acids, soybean oil, canola oil, vegetable oil, corn oil, sunflower oil, flaxseed oil, sesame oil, olive oil, peanut oil, cottonseed oil, safflower oil, rape seed oil, or any mixture thereof.

69. The method according to paragraphs 67 or 68, wherein the aromatic alcohol comprises phenol, naphthol, cresol, xylenol, guaiacol, bisphenol A, polyphenol, isomers thereof, or any mixture thereof.

70. The method according to any one of paragraphs 67 to 69, wherein the coupling reagent comprises ethylene glycol, propylene glycol, butylene glycol, polyethylene glycol, polypropylene glycol, glycerol, trimethylolpropane, pentaerythritol, isomers thereof, salts thereof, ethers thereof, or any mixture thereof.

71. The method according to any one of paragraphs 67 to 70, wherein the acylation reagent comprises acetic anhydride, acetic acid, acetic chloride, propionic acid, butyric acid, valeric acid, caproic acid, benzoic acid, succinic anhydride, maleic anhydride, succinic acid, maleic acid, fumaric acid, isomers thereof, salts thereof, esters thereof, or any mixture thereof.

72. The method according to any one of paragraphs 67 to 71, wherein the unsaturated fatty acid and the aromatic alcohol are reacted at a temperature of about 20° C. to about 250° C. for a period of about 2 hours to about 24 hours to produce the phenolated fatty acid.

73. The method according to any one of paragraphs 67 to 72, wherein the phenolated fatty acid and the coupling reagent are reacted at a temperature of about 150° C. to about 300° C. for a period of about 1 hour to about 12 hours to produce the phenolated fatty acid diester.

74. The method according to any one of paragraphs 67 to 73, wherein the phenolated fatty acid diester and the acylation reagent are reacted at a temperature of about 20° C. to about 200° C. for a period of time of about 0.5 hours to about 10 hours.

75. The method according to any one of paragraphs 67 to 74, wherein the unsaturated fatty acid and the aromatic alcohol are reacted in the presence of a phenolation catalyst to produce the phenolated fatty acid.

76. The method according to paragraph 75, wherein the phenolation catalyst comprises a Brønsted acid, a Lewis acid, or a mixture thereof.

77. The method according to paragraph 75 or 76, wherein the phenolation catalyst comprises sulfuric acid, sulfonic acid, polymeric sulfonic acid catalyst, methanesulfonic acid, trifluoromethanesulfonic acid, p-toluenesulfonic acid, phosphoric acids, orthophosphoric acid, metaphosphoric acid, pyrophosphoric acid, isomers thereof, salts thereof, or any mixture thereof.

78. The method according to any one of paragraphs 75 to 77, wherein the phenolation catalyst comprises boron trifluoride, aluminum chloride, zinc chloride, iron chloride, tin chloride, titanium chloride, halides thereof, complexes thereof, salts thereof, or any mixture thereof.

79. The method according to any one of paragraphs 67 to 78, wherein the phenolated fatty acid and the coupling reagent are reacted in the presence of an esterification catalyst to produce the phenolated fatty acid diester.

80. The method according to paragraph 79, wherein the esterification catalyst comprises stannous octoate, stannous 2-ethylhexanoate, titanium tetraisopropoxide, titanium tetrabutoxide, sulfuric acid, methanesulfonic acid, trifluoromethanesulfonic acid, p-toluenesulfonic acid, dodecylbenzenesulfonic acid, taurine, polymeric sulfonic acids, polymeric perfluorosulfonic acids, sulfonated tetrafluoroethylene-based fluoropolymer materials, isomers thereof, salts thereof, or any mixture thereof.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments, other and further embodiments of the invention can be devised without departing from the basic scope thereof, and the scope thereof is determined by the claims that follow.

What is claimed is:

1. A plastic composition, comprising:
a polymer comprising a polyvinyl chloride, a polyvinylidene chloride, a cellulose ester, a cellulose ether, a cellulose nitrate, a polyacrylate, a polyurethane, a copolymer thereof, or any mixture thereof; and
a plasticizer comprising an acylated phenolated fatty acid diester, wherein the plastic composition comprises the plasticizer in an amount of about 10 wt % to about 60 wt %, based on a combined weight of the polymer and the plasticizer.

2. The plastic composition of claim 1, wherein the plastic composition comprises about 30 wt % to about 50 wt % of the plasticizer, based on the combined weight of the polymer and the plasticizer.

3. The plastic composition of claim 1, wherein:
the acylated phenolated fatty acid diester is produced by reacting a phenolated fatty acid diester with an acylation reagent,
the phenolated fatty acid diester is produced by reacting a phenolated fatty acid with a coupling reagent, and
the phenolated fatty acid is produced by reacting an unsaturated fatty acid with an aromatic alcohol.

4. The plastic composition of claim 3, wherein:
the acylation reagent comprises acetic anhydride, acetic acid, acetic chloride, propionic acid, butyric acid, valeric acid, caproic acid, benzoic acid, succinic anhydride, maleic anhydride, succinic acid, maleic acid, fumaric acid, or any mixture thereof,
the coupling reagent comprises ethylene glycol, propylene glycol, butylene glycol, polyethylene glycol, polypropylene glycol, glycerol, trimethylolpropane, pentaerythritol, isomers thereof, salts thereof, ethers thereof, or any mixture thereof,
the unsaturated fatty acid comprises a fatty acid derived from a crude tall oil, and
the aromatic alcohol comprises phenol, naphthol, cresol, xylenol, guaiacol, bisphenol A, polyphenol, isomers thereof, or any mixture thereof.

5. The plastic composition of claim 4, wherein the plastic composition comprises about 10 wt % to about 30 wt % of the plasticizer, based on the combined weight of the polymer and the plasticizer.

6. The plastic composition of claim 4, wherein the plastic composition comprises about 35 wt % to about 55 wt % of the plasticizer, based on the combined weight of the polymer and the plasticizer.

7. The plastic composition of claim 1, wherein the polymer comprises a polyvinyl chloride.

8. The plastic composition of claim 1, wherein the plasticizer is a mixture of the acylated phenolated fatty acid diester and an acylated phenolated fatty acid monoester.

9. The plastic composition of claim 8, wherein:
the acylated phenolated fatty acid monoester is produced by reacting a phenolated fatty acid monoester with an acylation reagent,
the phenolated fatty acid monoester is produced by reacting a phenolated fatty acid with a capping reagent, and
the phenolated fatty acid is produced by reacting an unsaturated fatty acid with an aromatic alcohol.

10. The plastic composition of claim 9, wherein:
the acylation reagent comprises acetic anhydride, acetic acid, acetic chloride, propionic acid, butyric acid, valeric acid, caproic acid, benzoic acid, succinic anhydride, maleic anhydride, succinic acid, maleic acid, fumaric acid, or any mixture thereof,
the capping reagent comprises methanol, ethanol, butanol, pentanol, phenol, hexanol, 2-ethylhexanol, heptanol, octanol, nonanol, isononanol, decanol, isodecanol, benzyl alcohol, or any mixture thereof,
the unsaturated fatty acid comprises a fatty acid derived from a crude tall oil, and the aromatic alcohol comprises phenol, naphthol, cresol, xylenol, guaiacol, bisphenol A, polyphenol, isomers thereof, or any mixture thereof.

11. The plastic composition of claim 1, wherein:
the acylated phenolated fatty acid diester is produced by reacting a phenolated fatty acid diester with an acylation reagent,
the phenolated fatty acid diester is produced by reacting a phenolated fatty acid with a coupling reagent, and
the phenolated fatty acid is produced by reacting unsaturated tall oil fatty acids with an aromatic alcohol.

12. The plastic composition of claim 11, wherein:
the acylation reagent comprises acetic anhydride, acetic acid, acetic chloride, propionic acid, butyric acid, valeric acid, caproic acid, benzoic acid, succinic anhydride, maleic anhydride, succinic acid, maleic acid, fumaric acid, or any mixture thereof,
the coupling reagent comprises ethylene glycol, propylene glycol, butylene glycol, polyethylene glycol, polypropylene glycol, glycerol, trimethylolpropane, pentaerythritol, isomers thereof, salts thereof, ethers thereof, or any mixture thereof, and
the aromatic alcohol comprises phenol, naphthol, cresol, xylenol, guaiacol, bisphenol A, polyphenol, isomers thereof, or any mixture thereof.

13. The plastic composition of claim 1, wherein the plastic composition comprises about 10 wt % to about 30 wt % of the plasticizer, based on the combined weight of the polymer and the plasticizer.

14. The plastic composition of claim 1, wherein the plastic composition comprises about 35 wt % to about 55 wt % of the plasticizer, based on the combined weight of the polymer and the plasticizer.

15. A plastic composition comprising a polymer and about 10 wt % to about 60 wt % of a plasticizer, based on a combined weight of the polymer and the plasticizer, wherein:
the polymer comprises a polyvinyl chloride, a polyvinylidene chloride, or a mixture thereof, and
the plasticizer comprises an acylated phenolated fatty acid diester.

16. The plastic composition of claim 15, wherein:
the acylated phenolated fatty acid diester is produced by reacting a phenolated fatty acid diester with an acylation reagent,
the phenolated fatty acid diester is produced by reacting a phenolated fatty acid with a coupling reagent, and
the phenolated fatty acid is produced by reacting an unsaturated fatty acid with an aromatic alcohol.

17. The plastic composition of claim 16, wherein:
the acylation reagent comprises acetic anhydride, acetic acid, acetic chloride, propionic acid, butyric acid, valeric acid, caproic acid, benzoic acid, succinic anhydride, maleic anhydride, succinic acid, maleic acid, fumaric acid, or any mixture thereof,
the coupling reagent comprises ethylene glycol, propylene glycol, butylene glycol, polyethylene glycol, polypropylene glycol, glycerol, trimethylolpropane, pentaerythritol, isomers thereof, salts thereof, ethers thereof, or any mixture thereof,
the unsaturated fatty acid comprises a fatty acid derived from a crude tall oil, and
the aromatic alcohol comprises phenol, naphthol, cresol, xylenol, guaiacol, bisphenol A, polyphenol, isomers thereof, or any mixture thereof.

18. A process for making a plastic composition, comprising:
mixing a polymer and a plasticizer to produce a plastic composition comprising about 10 wt % to about 60 wt % of the plasticizer, based on a combined weight of the polymer and the plasticizer, wherein the polymer comprises a polyvinyl chloride, a polyvinylidene chloride, a cellulose ester, a cellulose ether, a cellulose nitrate, a polyacrylate, a polyurethane, a copolymer thereof, or any mixture thereof, and wherein the plasticizer comprises an acylated phenolated fatty acid diester.

19. The process of claim 18, wherein:
the acylated phenolated fatty acid diester is produced by reacting a phenolated fatty acid diester with an acylation reagent,
the phenolated fatty acid diester is produced by reacting a phenolated fatty acid with a coupling reagent, and
the phenolated fatty acid is produced by reacting an unsaturated fatty acid with an aromatic alcohol.

20. The process of claim 19, wherein:
the acylation reagent comprises acetic anhydride, acetic acid, acetic chloride, propionic acid, butyric acid, valeric acid, caproic acid, benzoic acid, succinic anhydride, maleic anhydride, succinic acid, maleic acid, fumaric acid, or any mixture thereof,
the coupling reagent comprises ethylene glycol, propylene glycol, butylene glycol, polyethylene glycol, polypropylene glycol, glycerol, trimethylolpropane, pentaerythritol, isomers thereof, salts thereof, ethers thereof, or any mixture thereof,
the unsaturated fatty acid comprises a fatty acid derived from a crude tall oil, and
the aromatic alcohol comprises phenol, naphthol, cresol, xylenol, guaiacol, bisphenol A, polyphenol, isomers thereof, or any mixture thereof.

* * * * *